(12) United States Patent
Heinen et al.

(10) Patent No.: US 9,387,758 B2
(45) Date of Patent: Jul. 12, 2016

(54) IN-WHEEL MOTOR WITH BRAKE

(71) Applicant: e-Traction Europe B.V., Apeldoorn (NL)

(72) Inventors: Adrianus Johannes Heinen, Apeldoorn (NL); Timothy van Seventer, Velp (NL)

(73) Assignee: E-TRACTION EUROPE B.V., Apeldoorn (NL)

( * ) Notice: Subject to any disclaimer, the term of this patent is extended or adjusted under 35 U.S.C. 154(b) by 67 days.

(21) Appl. No.: 14/178,952

(22) Filed: Feb. 12, 2014

(65) Prior Publication Data

US 2014/0159468 A1    Jun. 12, 2014

Related U.S. Application Data

(63) Continuation of application No. PCT/NL2012/050559, filed on Aug. 10, 2012.

(60) Provisional application No. 61/523,145, filed on Aug. 12, 2011.

(30) Foreign Application Priority Data

Aug. 12, 2011    (NL) .................................... 2007261

(51) Int. Cl.
*B60K 7/00*    (2006.01)
*F16D 65/78*    (2006.01)
(Continued)

(52) U.S. Cl.
CPC ............... B60K 7/0007 (2013.01); B60L 3/003 (2013.01); B60L 3/0061 (2013.01); B60L 3/0076 (2013.01);
(Continued)

(58) Field of Classification Search
CPC ....... B60K 7/007; B60L 3/0076; B60L 15/20; B60L 11/1803; B60L 7/006; B60L 3/003; B60L 7/14; B60L 15/2009; B60L 3/0061; B60L 7/24; B60L 2220/44; B60L 2240/36; B60L 2240/423; F16D 65/78; Y10T 29/49826
USPC ......................................................... 180/65.1
See application file for complete search history.

(56) References Cited

U.S. PATENT DOCUMENTS

| | | | |
|---|---|---|---|
| 6,768,932 B2 * | 7/2004 | Claypole | ................ B60G 13/14 280/781 |
| 6,942,049 B2 * | 9/2005 | Shimizu | ....................... 180/65.6 |

(Continued)

FOREIGN PATENT DOCUMENTS

| | | |
|---|---|---|
| DE | 102009035176 A1 | 2/2011 |
| EP | 1000829 A1 | 5/2000 |

(Continued)

*Primary Examiner* — Brodie Follman
*Assistant Examiner* — Brian Cassidy
(74) *Attorney, Agent, or Firm* — Young & Thompson

(57) ABSTRACT

The invention relates to wheel for a vehicle comprising, inside the wheel:
   a housing having a first side for mounting to a vehicle,
   an electrical motor for driving movement of said vehicle, said electrical motor comprising a stator rotation-fixedly connected to said housing and a rotor rotationally coupled to said stator and having an axis of rotation, said stator being arranged within said rotor, and
   a brake drum, forming an integral piece of equipment with the rotor.
The invention further relates to a vehicle provided with such a wheel and a method and an adapter plate for mounting such a wheel to a vehicle, and to such a wheel having a rim system in which the rim forms an integral part with said rotor and with a brake drum of the brake system, i.e. forming one integral price of equipment.

29 Claims, 7 Drawing Sheets

(51) Int. Cl.
*B60L 3/00* (2006.01)
*B60L 7/00* (2006.01)
*B60L 7/14* (2006.01)
*B60L 7/24* (2006.01)
*B60L 11/18* (2006.01)
*B60L 15/20* (2006.01)

(52) U.S. Cl.
CPC . *B60L 7/006* (2013.01); *B60L 7/14* (2013.01); *B60L 7/24* (2013.01); *B60L 11/1803* (2013.01); *B60L 15/20* (2013.01); *B60L 15/2009* (2013.01); *F16D 65/78* (2013.01); *B60L 2220/44* (2013.01); *B60L 2240/36* (2013.01); *B60L 2240/423* (2013.01); *Y02T 10/645* (2013.01); *Y02T 10/7005* (2013.01); *Y02T 10/72* (2013.01); *Y02T 10/7275* (2013.01); *Y10T 29/49826* (2015.01)

(56) References Cited

U.S. PATENT DOCUMENTS

| | | | | |
|---|---|---|---|---|
| 7,420,301 B2 * | 9/2008 | Veny et al. | ................ | 310/75 C |
| 7,445,067 B2 * | 11/2008 | Marsh et al. | ................ | 180/65.51 |
| 7,938,211 B2 * | 5/2011 | Yoshino et al. | ............. | 180/65.51 |
| 8,247,936 B2 * | 8/2012 | Sagara et al. | ................ | 310/68 C |
| 8,253,284 B2 * | 8/2012 | Sagara et al. | .................... | 310/43 |
| 8,316,973 B2 * | 11/2012 | Walter et al. | ................ | 180/65.51 |
| 8,459,386 B2 * | 6/2013 | Pickholz | .............. | B60K 7/0007 180/65.31 |
| 8,688,345 B2 * | 4/2014 | Boughtwood | .......... | B60L 7/006 123/90.17 |
| 8,807,251 B2 * | 8/2014 | Pandya | ................. | B60K 7/007 180/55 |
| 2006/0158050 A1 | 7/2006 | Maeda et al. | | |
| 2008/0070736 A1 | 3/2008 | Yoshino et al. | | |
| 2010/0138127 A1 * | 6/2010 | Boughtwood | .......... | B60L 7/006 701/71 |

FOREIGN PATENT DOCUMENTS

| EP | 1895183 A1 | 3/2008 |
|---|---|---|
| WO | 2006137188 A1 | 12/2006 |
| WO | 2010101914 A1 | 9/2010 |

* cited by examiner

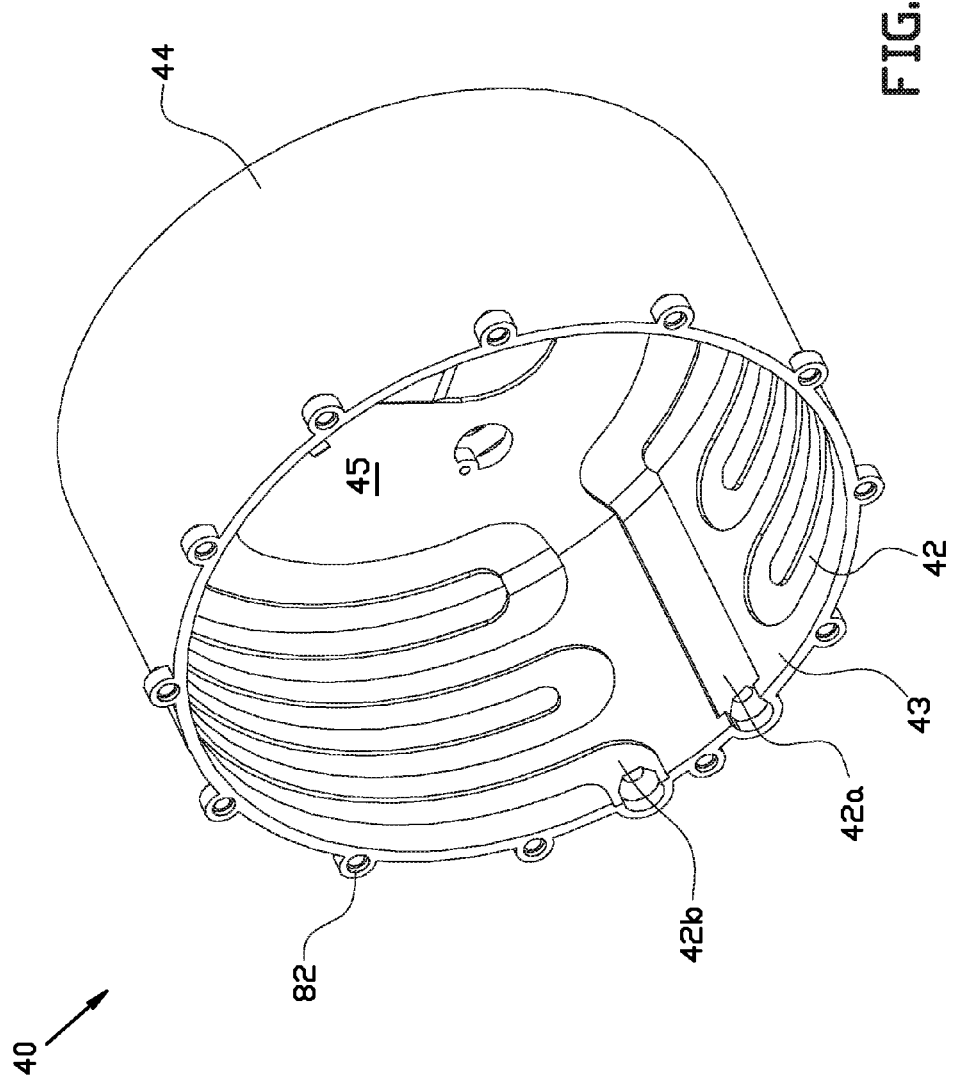

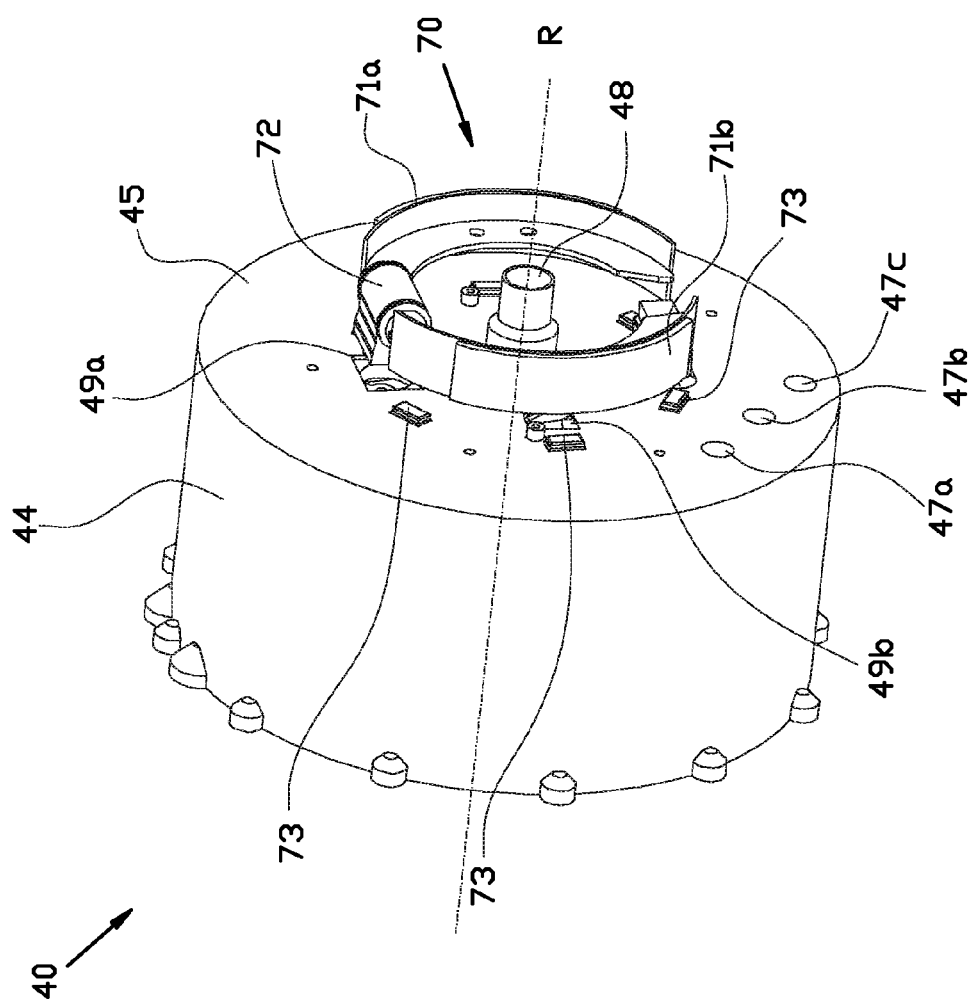

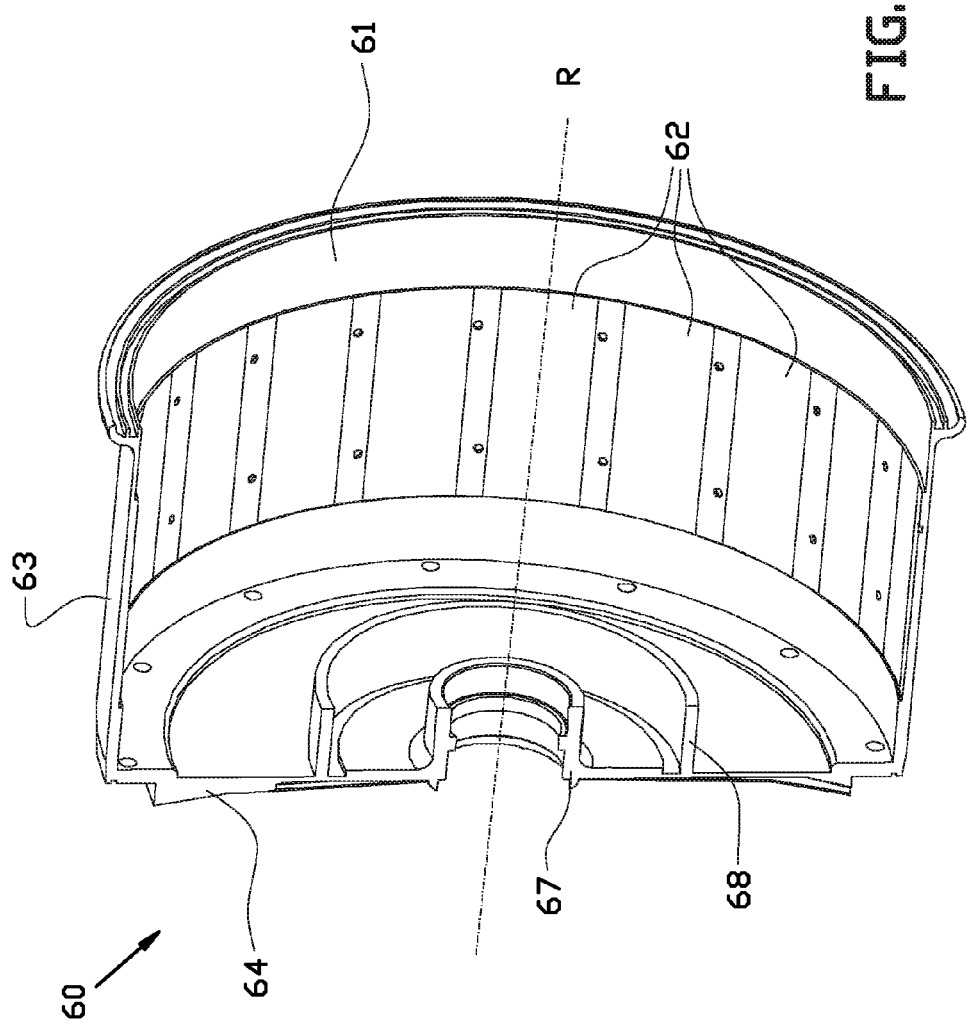

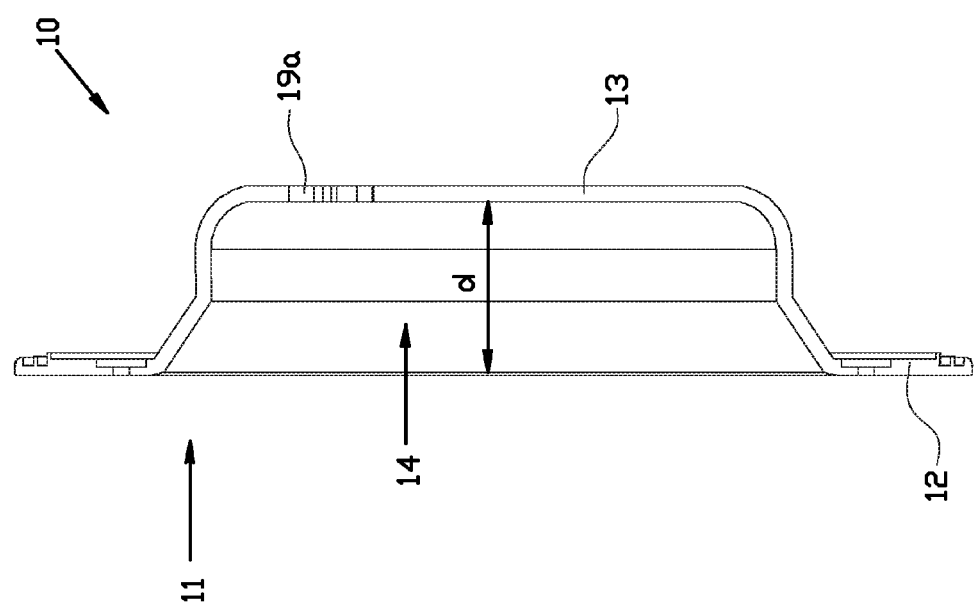

IN-WHEEL MOTOR WITH BRAKE

CROSS REFERENCE

This application is a continuation of PCT/NL2012/050559 filed Aug. 10, 2012, which claims priority to The Netherlands application number 2007261 filed Aug. 12, 2011 and U.S. provisional application No. 61/523,145 filed Aug. 12, 2011, the entire contents of each of which are incorporated herein in their entireties.

BACKGROUND

The invention relates to an in-wheel motor with a brake. Such an in-wheel motor is described for instance in International Patent application WO 2010/101914, describing a wheel assembly for a vehicle, comprising: a non-rotating support member, a wheel including a rim, a spider and a wheel hub, the rim having a radially inner surface, wherein the wheel is rotatably supported by the non-rotating support member for rotation about a wheel axis; and an electric motor having an axially extending motor aperture, wherein the electric motor includes a non-rotating motor portion and a rotating motor portion, wherein the rotating motor portion is operatively connected to the wheel and is spaced from the radially inner surface of the rim for substantial isolation from any radially inwardly directed forces from the radially inner surface of the rim, wherein the non-rotating motor portion is fixedly connected to the non-rotating support member. The assembly, which optionally further comprises a brake, is to be mounted to a vehicle via a suspension shaft.

However, in the known assembly, the rotating motor portion is arranged within the non-rotating motor portion, and a space consuming and complex mechanism is required to transfer rotational motion of the rotor to the rim of the wheel.

It is an object of the present invention to provide an improved in-wheel motor with an integrated brake system having a less complex construction.

SUMMARY OF THE INVENTION

To this end, according to a first aspect, the present invention provides a wheel for a vehicle comprising, inside the wheel:
a housing having a first side for mounting to the vehicle,
an electrical motor for driving movement of said wheel, said electrical motor comprising a stator rotation-fixedly connected to said housing and a rotor rotationally coupled to said stator and having an axis of rotation, said stator being arranged within said rotor, and
a brake system adapted for engaging the rotor for braking movement of said rotor relative to the stator,
characterized in that said housing comprises a shaft rotation fixedly attached to said housing and protruding coaxially with the axis of rotation from said housing, wherein said shaft, when viewed along the axis of rotation, is spaced apart from said first side,
wherein the rotor comprises a rim for mounting a tire thereon, and said rotor further comprises a wheel plate comprising a hub for accommodating the shaft, said wheel plate further comprising said brake drum, wherein the rim, the wheel plate and the brake drum are attached together as one unity and/or as a single piece,
wherein said brake system comprises an actuator adapted for actuating engagement of said brake system with said drum, and
wherein the housing comprises control electronics for controlling the electromotor.

The wheel may thus be mounted as a module on a vehicle, without having to attach an additional brake exterior to the wheel, and without having to provide additional electronics in the vehicle for controlling the electromotor.

The control electronics are preferably completely contained within or enveloped by the housing, and thus substantially protected against particles and/or liquids from outside said housing. In such a case the space taken up by the control electronics along the direction of the axis of rotation is limited by the width of the housing along the axis of rotation. Preferably the control electronics have a longitudinal axis which is oriented substantially perpendicular to the axis of rotation of the wheel. For example, the electronics comprises a planar Printed Circuit Board (PCB), wherein the plane of the PCB is arranged at least substantially perpendicular to the axis of rotation.

Preferably the brake system is attached to the housing, e.g. in or on the housing. Any braking force exerted on the wheel is transmitted through the housing to the vehicle, and not through the shaft. Consequently, the shaft may be of a relatively light construction.

Assembly, disassembly, maintenance and repair of the wheel provided by the present invention is facilitated as the rim, the wheel plate, and the drum are attached to each other as a single piece, e.g. formed from a single contiguous block of material such as a metal, and require no further alignment or attachment relative to each other during assembly and disassembly of the rotor on the shaft.

Preferably the stator is rotation fixedly connected to the housing, and the combined rim, wheel plate and drum are rotatable connected to the housing via the shaft. Since the rotor is attached to the combined rim, wheel plate and drum, the rotor is rotationally coupled to said stator.

As the housing provides the shaft for supporting rotational movement of the rotor of the wheel, the wheel does not require a shaft to be mounted onto. The wheel of the invention may be mounted at any position at a vehicle, even independent of the position of mounting elements of the vehicle which are adapted for mounting a wheel to the vehicle. The wheel can be mounted without any mechanical changes of the vehicle construction.

Preferably however the original mounting elements of a vehicle retrofitted with a wheel according to the invention are left in place and/or used when mounting such a wheel to the vehicle. Additionally, there is no need to keep a multitude of bearings of different sizes at hand for fitting the wheel to existing wheel shafts of different vehicles. As there is no shaft running through the housing it is possible to use substantially flat and industrially available control electronics within the housing, in turn allowing the housing to be dimensioned small enough to be substantially completely contained within the wheel.

In an embodiment the control electronics comprise power electronics, e.g. IGBT current modules and a current regulator, for controlling and supplying power to the electromotor. The wheel according to the invention may thus be directly connected to a VDC power supply, without requiring additional power electronics such as inverters, to be installed in the vehicle itself. As there is no shaft running through the housing there is more space available within the housing for the power electronics, and the power electronics may be arranged anywhere within the housing, even at a position intersecting the axis of rotation.

In an embodiment the wheel is embodied as a direct drive wheel. The rotor thus directly drives the wheel, without any intermediate gears or the like, and the stator, in particular the magnets thereof, directly impart a rotational force on the rotor. Substantially no rotational force is transmitted to the rotor via the shaft or gears. In electrically powered wheels, such as direct drive wheels, it is particularly advantageous to place the rotor around the stator instead of the stator around the rotor. The torque which may be generated by a motor is a quadratic function of the diameter of the rotor. For instance, if a motor having a rotor with a diameter of 1 unit is capable of generating a torque of 1 Nm, then the same motor with a rotor having a diameter of 1.2 unit would be capable of generating a torque of 1.44 Nm.

In an embodiment the brake system is mounted on the housing, preferably on a side of the housing opposite from said first side. No additional space for the brake system is thus required between said vehicle and the first side of the housing.

In an embodiment said brake system is arranged, when viewed along the axis of rotation, between the rotor and the housing. The brake system is preferably arranged between said wheel plate of the rotor and the housing.

In an embodiment said brake system comprises a first engagement surface for braking engagement with a second engagement surface on the rotor, wherein said wheel further comprises collection means adapted for collecting brake wear particles. The chance of brake wear particles entering and interfering with the electrical components of the wheel is thus significantly reduced.

In an embodiment the collection means are located close to a point of engagement of said first and second engagement surfaces, preferably within a distance of 3 cm thereof. In a preferred embodiment the collection means are located closer to said point of engagement than to the wheel bearing. Collection means of relatively small dimensions may thus be used for effectively collecting brake wear particles.

In an embodiment the wheel further comprises a wheel bearing, wherein the collection means are adapted for collecting brake wear particles at a location spaced apart from said wheel bearing. The chance of brake wear particles entering and damaging the wheel bearing of the wheel is thus significantly reduced.

In an embodiment said first and/or second engagement surface comprises a metal, and said collection means comprise magnets, preferably permanent magnets, located close to said point of engagement. Preferably a metal or metal alloy is chosen that is easily attracted by magnetic forces, e.g. iron or nickel or an alloy comprising these.

In an embodiment the brake system is arranged spaced apart from said first side. Again, no additional space for the brake system is thus required between said vehicle and the first side of the housing.

In an embodiment said stator is arranged around the housing. Thus control electronics for controlling the electromotor of may easily fit within the wheel, while the stator may still have a width along the axis of rotation which is at least equal to the width of the housing along the axis of rotation. Preferably the stator comprises an inner circumferential surface which substantially abuts an out circumferential surface of the housing.

In an embodiment the rotor comprises a rim for mounting a tire thereon. Preferably, when a tire is mounted on the rim, it is slid over the rim from one side until the tire abuts a beveled edge of the rim, after which a rim ring is attached to the rim/rotor/drum brake at or near the edge of the rim opposite from said beveled edge, to hold the tire in place.

In an embodiment the stator comprises one or more electromagnets, wherein the rotor comprises permanent magnets placed around said one or more electromagnets. Together the stator and rotor thus form an electromotor controllable by control electronics.

In an embodiment said electromotor is, when seen along the axis of rotation, completely arranged between a first side of the rim and an opposite second side of the rim.

In an embodiment the brake system comprises a drum brake system.

In an embodiment said housing comprises a through passage for a wire or rod connected to the brake system from outside said wheel, wherein a displacement of the wire or rod relative to the brake system actuates the brake system. The present invention thus provides a mechanical brake system inside the wheel, which brake system may easily be connected to one or more brake wires or the like of a vehicle to which the wheel is attached. Preferably displacement of the wire or rod puts the brake system in a parking mode.

In an embodiment the housing comprises a through passage for a duct or conduit comprising brake fluid connected to the brake system from outside said wheel, wherein a pressure change of said brake fluid in the duct or conduct actuates the brake system. The wheel may thus easily be connected to one or more hydraulic brake conduits or the like of a vehicle to which the wheel is attached. Preferably, the wheel is provided connected to both a mechanical brake wire or rod, and a hydraulic brake conduit.

In an embodiment the housing comprises concave surface which is open-ended at said first side, wherein preferably a distance between a point of said surface furthest from said first side and said first side along the axis of rotation is greater than or equal to one fourth of the width of the wheel along said axis of rotation, preferably greater than or equal to one third thereof. Thus sufficient space is provided within the wheel for accommodating protrusions from the vehicle, e.g. existing wheel mounting elements, such that these protrusions do not have to be modified when mounting the wheel on the vehicle.

In an embodiment said housing extends along the width of said wheel along the axis of rotation over at least half of said width, preferably over at least three fourths of said width. The housing thus provides an effective support for the stator.

In an embodiment substantially all parts of the wheel within the housing at said first side are rotationally fixed relative to said housing. The housing may thus be constructed free from bearings within the housing. Moreover, placement of any bearings within the wheel exterior to the housing allows for easy maintenance, replacement and/or inspection of the bearings without opening up the housing.

In an embodiment the housing further comprises a cooling system adapted for cooling any one of the electrical motor, the control electronics and/or the brake system. As the housing is closely adjacent to a substantial part of the electrical motor and the control electronics, effective cooling may be achieved. The cooling system preferably comprises a cooling duct close to an outer surface of the stator and/or the control electronics, and is preferably adapted for the passage of a cooling fluid.

In an embodiment the rotor comprises a rim for mounting a tire thereon, and a wheel plate comprising a hub for accommodating a wheel shaft, said wheel plate further comprising a brake drum, wherein the rim and wheel plate are formed together as one unity or as a single piece. By providing the rim, wheel plate, hub and brake drum as a single piece, a strong and lightweight yet simple construction is achieved.

In an embodiment said housing comprises a substantially hollow body having a circumferential wall and a substantially open first side and an opposite substantially closed second side. The hollow body preferably has a cylindrical shape. Preferably the cooling system also has a circumferential wall and a substantially open first side and an opposite substantially closed second side, such that the hollow body and the cooling system of the housing define a hollow portion and are open ended at the first side. In a preferred embodiment the cooling system is dimensioned such that the outer surface of its circumferential wall may be placed substantially abutting the inner surface of the circumferential wall of the hollow body.

In an embodiment said housing further comprises an attachment adapter having a flange for attachment to the vehicle, and a substantially closed surface spaced apart from said flange when viewed along the axis of rotation. When the attachment adapter is attached at the first side of the hollow body, the closed surface substantially closes off said first side and thus the interior of the housing. When the attachment adapter is fitted to a vehicle already having a wheel axle, this wheel axle, or indeed any other part of the vehicle, may at least partially protrude into the open end of the adapter. It is thus not necessary to cut off an existing wheel axle of a vehicle when it is retrofitted with a wheel according to the invention. Preferably a number of interchangeable attachment adapters is provided for the housing, each adapter suitable for a predetermined type of vehicle, for instance for vehicles having different kinds of wheel housings. The distance along the axis of rotation between the flange and the substantially closed surface of the adapter may vary between the interchangeable attachment adapters, as may the width of the flange along the axis of rotation. It is noted that the use of an attachment adapter as described herein is also advantageous in an electric wheel according to the invention from which the brake system has been omitted. The substantially closed surface is preferably substantially normal to the axis of rotation, and preferably disc shaped.

In an embodiment said flange has a diameter greater than or equal to the diameter of said closed surface. Thus the housing may easily be mounted on the flange as well and a strong attachment of the adapter with the vehicle may be obtained.

In an embodiment the attachment adapter is substantially shaped as an open ended flat-topped cone or an open ended flat-topped cylinder.

In an embodiment the substantially closed surface of the attachment adapter is spaced apart from said flange along the axis of rotation by a distance of at least one fifth of the width of said wheel along said axis of rotation.

According to a second aspect the present invention provides a vehicle provided with a wheel according to the invention.

According to a third aspect the present invention provides a method for attaching a wheel to a vehicle, said wheel comprising a housing having a first side for mounting to a vehicle, an electrical motor for driving movement of said vehicle, said electrical motor comprising a stator rotation-fixedly connected to said housing and a rotor rotationally coupled to said stator and having an axis of rotation, said stator being arranged within said rotor, said wheel further comprising a brake system adapted for engaging the rotor for braking movement of said rotor relative to the stator, wherein said housing comprises control electronics for controlling the electrical motor, and wherein said brake system is arranged, when viewed along the axis of rotation, between the rotor and the housing, said method comprising the steps of:

selecting an attachment adapter from a series of attachment adapters having different dimensions, mounting the selected attachment adapter to said first side of the housing, mounting the selected attachment adapter to said vehicle, wherein the attachment adapter is selected based on a specific make or model of the vehicle.

In an embodiment the attachment adapters of the series of attachment adapters each have a flange for attachment to the vehicle, and a substantially closed surface, wherein the flanges have substantially similar dimensions, and a distance between the flange and the closed surface of each adapter varies in the series of adapters.

According to a fourth aspect the present invention provides a wheel for a vehicle comprising, inside the wheel:

a housing having a first side for mounting to a vehicle, an electrical motor for driving movement of said vehicle, said electrical motor comprising a stator rotation-fixedly connected to said housing and a rotor rotationally coupled to said stator and having an axis of rotation, said stator being arranged within said rotor, and a brake system adapted for engaging the rotor for braking movement of said rotor relative to the stator.

In an embodiment the rotor comprises a rim for mounting a tire thereon, and a wheel plate comprising a hub for accommodating a wheel shaft, said wheel plate further comprising a brake drum, wherein the rim and wheel plate are formed together as one unity and/or as a single piece.

In summary the present invention relates to wheel for a vehicle comprising, inside the wheel: a housing having a first side for mounting to a vehicle, an electrical motor for driving movement of said vehicle, said electrical motor comprising a stator rotation-fixedly connected to said housing and a rotor rotationally coupled to said stator and having an axis of rotation, said stator being arranged within said rotor, and a brake drum, forming an integral piece of equipment with the rotor. The invention further relates to such a wheel comprising a brake system within the wheel, and further having a rim system in which the rim forms an integral part with said rotor and with a brake drum of the brake system, i.e. forming one integral price of equipment. In a preferred embodiment the brake system is located on a side of the housing opposite from said first side. The invention further relates to a vehicle provided with a wheel according to the invention and a method and an adapter plate for mounting such a wheel to a vehicle.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which:

FIGS. 2A and 2B show an isometric backside view and a isometric front side view of a housing according to the invention, FIG. 3 shows a cross-sectional view of a part of a rotor of a wheel according to the invention FIG. 4 shows a cross-sectional side view of an attachment adapter of a wheel according to the invention.

DETAILED DESCRIPTION OF THE INVENTION

Figure 1A:
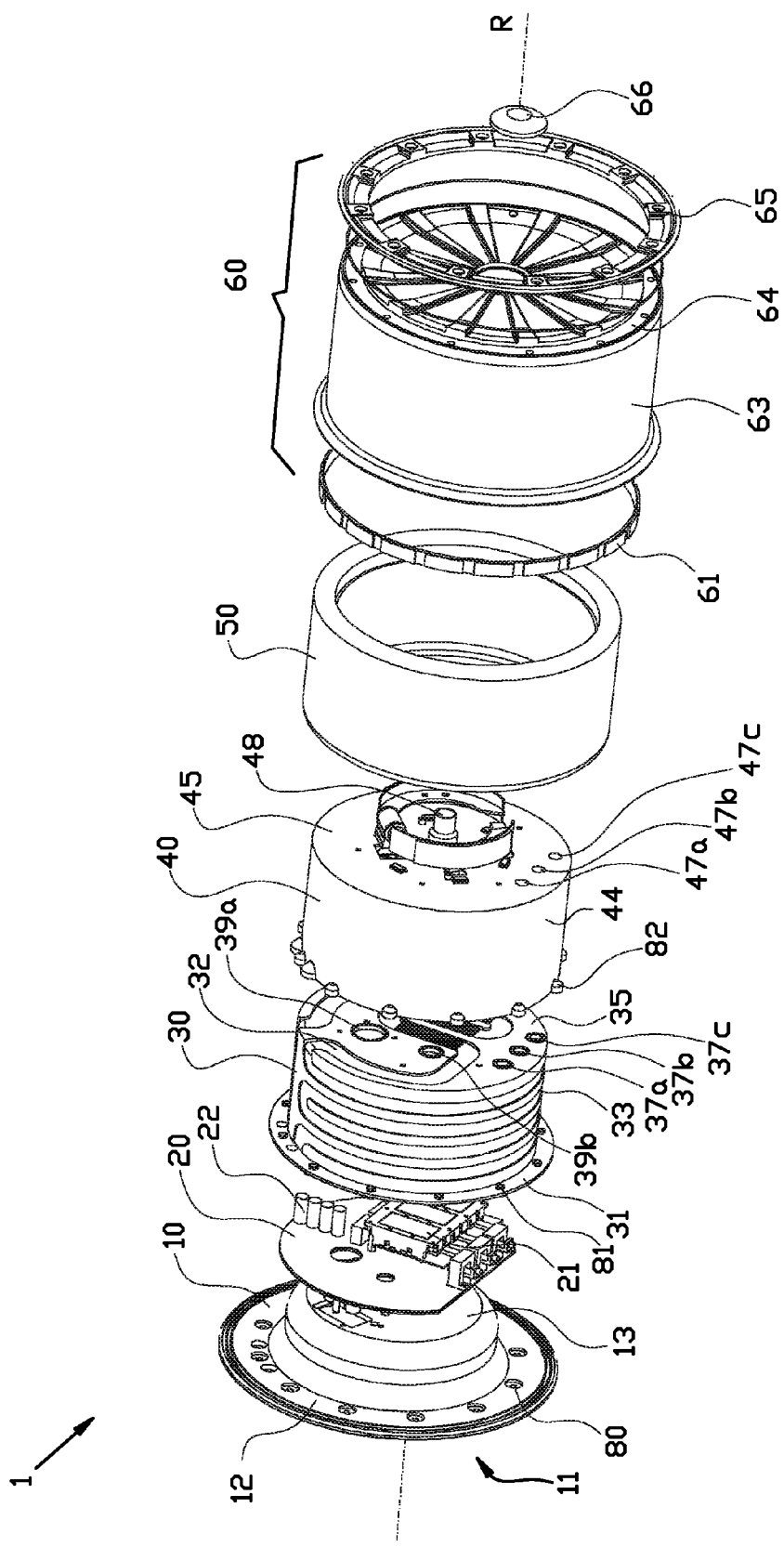
FIGS. 1A and 1B show an exploded view and a cross-sectional exploded view respectively of a wheel according to the present invention.
Figure 1B:
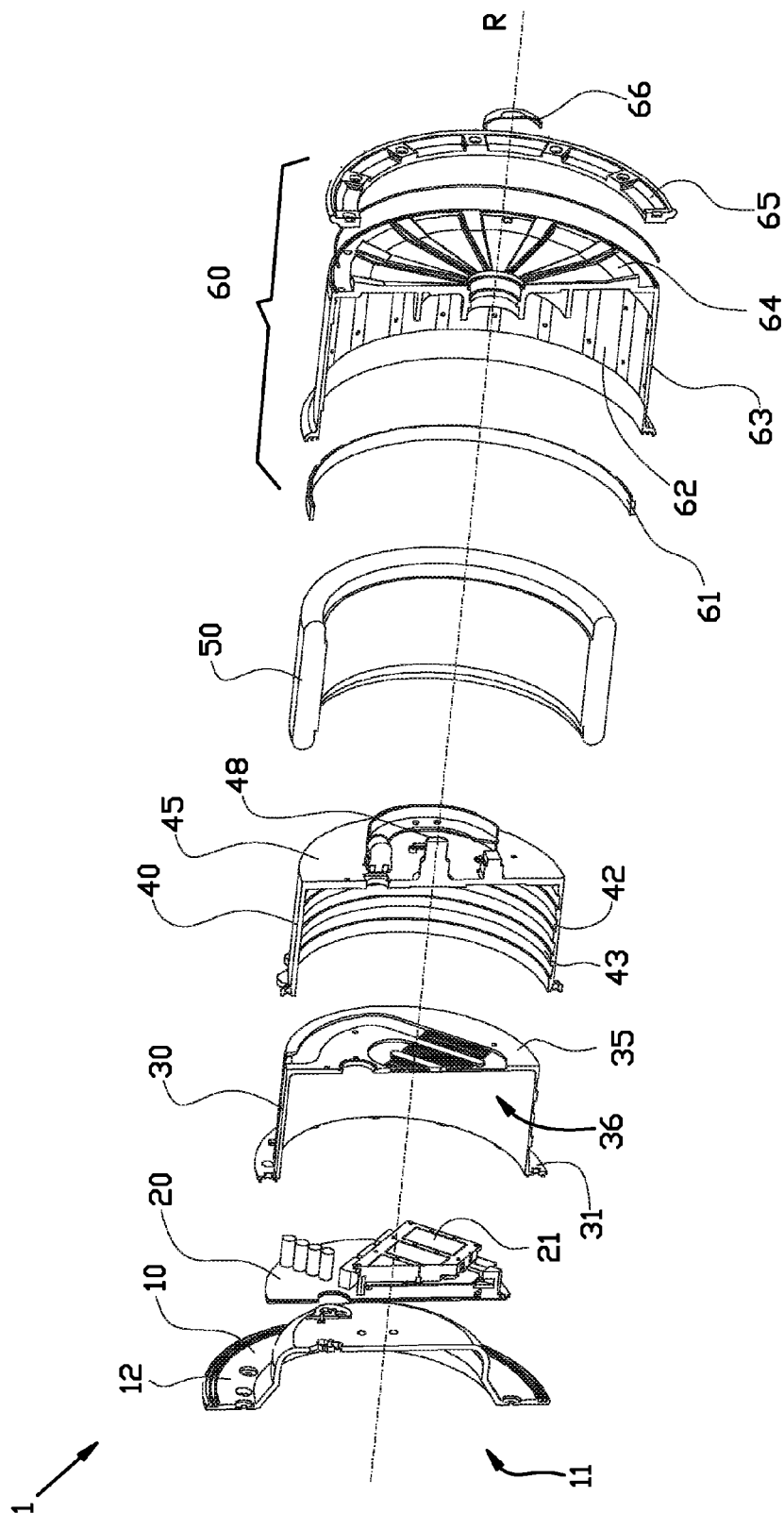

FIGS. 1A and 1B show an exploded view of a wheel 1 according to the invention and a cross-sectional view thereof respectively. The wheel 1 comprises an attachment adapter, or adapter plate 10, and a hollow body 40, which when assembled together with cooling system 30 forms a housing. The adapter plate 10 comprises a flange 12 at a first side 11 of the housing for mounting the wheel to a vehicle. Alternatively, the adapter plate 10 may be omitted and the housing 30,40 may be mounted with a first side 31 directly to the vehicle. The wheel 1 comprises an electrical motor comprising a stator 50, which is rotation-fixedly connected to the housing 30,40, and a rotor 60, which is rotationally coupled to said stator and which has an axis of rotation R. The stator 50 comprises a number of stator windings of a conductive material, which form one or more electromagnets as known in the art. The rotor 60 comprises permanent magnets 62 (see FIG. 1B) arranged around the axis of rotation R and close to an inner circumferential surface of a rim 63 which rim has an outer circumferential surface for mounting a tire thereon. The permanent magnets are held in place in the rim 63 by mechanical locking ring 61. The rotor further comprises a wheel plate 64, a rim ring 65 and a wheel cover 66. The mechanical locking ring 61, the permanent magnets 62, the rim 63, the wheel plate 64, rim ring 65 and wheel cover 66 are all rotationally fixed with respect to each other, and the permanent magnets 62, the rim 63, the wheel plate 64, the bearing support 67 and the brake drum 68, also denoted as brake rim, together form one piece of construction. Within the housing 30,40 the wheel 1 comprises control electronics 20 for controlling the electrical motor such that the electromagnets in the stator 50 may provide a magnetic field for providing a rotating motion to the permanent magnets 62 of the rotor relative to the housing 30,40 around the axis of rotation R. The control electronics comprise one or more IGBT current modules 21 and a current regulator 22. The housing comprises an exterior hollow body 40, and an interior hollow body 30, the latter forming a cooling system of the housing. The cooling system 30 comprises a groove 32 for the flow of a cooling fluid, such as water, for cooling the control electronics 20 and the stator 50. Both the housing hollow body 40 and the cooling system 30 of the housing comprise a hollow cylinder each having an open end at the first side of the wheel, and a substantially closed end 35,45 at their respective opposite sides, wherein the cooling 30 system is adapted to be substantially fittingly inserted in the hollow body 40. In the assembled state, the outer surface 33 of the cooling system 30 substantially abuts the inner surface 43 of the housing 40, which is provided with a corresponding groove 42. As a result the cooling fluid can be transported through the housing 30,40 and the cooling close to an outer surface 44 of the circumferential wall and of the closed end 45 of the hollow body 40 for cooling the electromagnet of the stator 50, and close to an inner surface 36 of cooling system 30, in particular an inner surface of the closed end 35, for cooling the control electronics 30. Both the hollow body 40 and the cooling system 30 of the housing are provided with matching through holes 37a, 37b,37c, 47a,47b,47b through which power supply lines (not shown) may lead from the control electronics 20 to the electromagnets of the stator 50.

The housing is provided with a shaft 48, which is spaced apart from the first side 11 of the wheel and which protrudes from the closed end of the hollow body 40 of the housing. The shaft 48 provides bearing support for the rotor 60, which is rotationally connected thereto by means of bearings (not shown), and has a length less than one fourth of the width of the wheel as viewed along the axis of rotation. As the shaft is relatively short, i.e. it does not extend along substantially the entire width of the wheel along the direction of the axis of rotation R, more space is available within the hollow body 40 for the control electronics 20 and cooling system 30.

When assembled, the adapter plate 10, and the hollow body 40 and cooling system 30 of the housing may clamped together by tightening bolts extending through bolt-holes 80,81 and 82 located at the flange 12 of the adapter plate 10 and at the edges at the open ends of the cooling system 30 and hollow body 40 respectively.

FIGS. 2A and 2B show the hollow body 40 of the housing and the brake system of the wheel according to the invention in more detail. FIG. 2A shows an isometric view of the hollow body 40 of the housing in which the inner surface of the housing is more clearly visible. The circumferential inner surface 43 is provided with a groove 42, which, together with corresponding groove 32 in the circumferential outer surface 33 of the cooling system 30, forms a duct when the wheel 1 is in the assembled state. The groove 42 has a start point 42a near the open end of the hollow body 40, and an end point 42b near the open end of the hollow body 40 as well. The groove 42 follows a substantially direct path from the start point 42a over the circumferential inner surface 43, towards the inward facing side of the closed end 45 and undulates back 43 from the closed end to the end point 42b over the circumferential inner surface 43. Cooling fluid running through grooves 32,42 in the circumferential walls cool said walls 32,44, and in turn help in cooling stator windings of the electromotor. Cooling fluid running through the groove in the closed ends 35,45, helps in cooling the control electronics 20.

FIG. 2B more clearly shows the through openings 47a,47b, 47c in the substantially closed end 45 of the hollow body 40. These through openings are adapted for passing power leads and/or control leads from the control electronics 20 inside the housing 30,40 to outside of the housing 30,40 for connection with the electrical windings of the stator 50. The stator 50 may thus conveniently be conductively connected to the control electronics 20 when the hollow body 40 and cooling system 30 of the housing, and the control electronics 20 have already been assembled. As can be seen in FIG. 1A, the cooling system 30 comprises corresponding through holes.

The hollow body 40 of the housing comprises two further through openings 49a, 49b which extend from the first side of the housing to the substantially closed opposite end 45 of the housing, and allow the passage of a hydraulic brake hose for connection with the brake cylinder, and a brake wire respectively for connection with the brake shoes. When a wheel according to the invention is mounted on a conventional vehicle, the brake hoses and wires that are already present in the vehicle may thus be easily attached to the wheel to provide the vehicle with mechanical braking capability, i.e. a brake system that is not dependent on functioning of electronic components. As shown in FIG. 1A, the cooling system 30 is provided with corresponding through holes 39a,39b, such that power leads, one or more hydraulic brake hoses and/or brake wires may run from within the housing to outside of the housing.

FIG. 2B also shows the brake system 70 in more detail. The brake system of the wheel is a mechanical brake system, of which brake shoes 71a,7b and a hydraulic brake cylinder 72 are shown. When the brake cylinder 72 expands, the brake shoes 71a,71b engage a brake drum of the rotor (not shown). The brake cylinder 72 is rotation fixedly attached to the hollow body 40 of the housing and may be operated in known manner using a hydraulic hose. Additionally, though not shown, the brake system may also comprise a parking brake lever for placing and/or locking the brake shoes 71a,71b in a position in which they engage the parking drum, preferably independent of the brake cylinder 72. When viewed along the axis of rotation R, the brake system 70 is comprised within the wheel and arranged between the rotor 60, in particular the wheel plate 64 thereof, and the housing 30,40. The brake system 70, and thus the wheel 1 may be mounted anywhere relative to a vehicle, substantially independent of the position and/or dimensions of any existing wheel axles of the vehicle, such as front or rear wheel axles of the vehicle.

In normal circumstances, braking of the vehicle will be done electrically by using the motors of the wheels in contra-rotation action, better known as regenerative braking, during which the brake shoes do not engage the drum. However, in rare circumstances when the mechanical brake system is activated while rotor is rotating, the brake shoes 71a,71b engage the drum and friction causes wear particles of the brake shoes 71a,71b and/or the drum to detach. These wear particles may damage the wheel when they get lodged between surfaces that move relative to each other, e.g. when they get lodged in the bearings between the shaft 48 of the hollow body 40 of the housing and the rotor 50. To prevent this, according to the present invention six permanent magnets 73 are mounted on the outward facing surface of the closed end 45 of the housing at positions close to the points of engagement between the brake shoes 71a,71b and the brake drum. In the embodiment shown, these permanent magnets are arranged close to an inner edge of the drum (not shown). The part of the brake shoes 71a,71b adapted for engaging the drum comprises a ferromagnetic material that is sufficiently attracted to the permanent magnets 73 such that wear particles formed during braking are substantially collected at these magnets 73.

FIG. 3 shows a cross-sectional view of part of a rotor 60 according to the invention. The rotor comprises a rim 63 for mounting a tire thereon, and a disc-shaped wheel plate 64 at least partially closing off a side of the rotor facing away from the first side of the housing. The rotor 60 further comprises several permanent magnets 62 held in rotation-fixed connection to the rim 63 by means of mechanical locking ring 61. The permanent magnets 62 are adapted for providing a rotational force to the rotor 60 relative to the stator for driving movement of a vehicle, when the electromagnets of the stator 50 are activated.

The wheel plate 64 comprises a hub 67 provided with bearings (not show) for connecting the rotor to the shaft 48 of the housing. The wheel plate 64 comprises a drum 68, comprising a metallic material, which extends along the rotational axis and is adapted for engagement with the braking shoes 71a,71b of the brake system when the brake system is activated. The rim 63, wheel plate 64, the hub 67 and drum 68 are formed together one unity, thus forming single component of the wheel which may easily be mounted to the housing 30,40 of the wheel, and which provides structural integrity to the rotor 60.

FIG. 4 shows a cross-sectional side view of an attachment adapter 10 of a wheel according to the present invention. The adapter 10 comprises a flange 12 for attachment to a vehicle, and a substantially closed surface facing away there from. On the opposite side of the closed surface 13, the adapter defines a hollow space 14, in which existing wheel axles or other protrusions of a vehicle may at least partly be accommodated. The distance d is the distance between the substantially closed surface 13 and the flange 12. Preferably, several adapters are available having different distances d, such that when the wheel according to the invention in mounted to a vehicle, a plate with a distance d suitable for said vehicle can be selected. This suitable distance is typically the smallest distance allowing the wheel to be mounted on the vehicle. In a preferred embodiment the control electronics 20 are mounted within the housing substantially close to the cooling system 30. Alternatively however, the control electronics may be mounted on the substantially closed surface of the attachment adapter.

Figure 5:
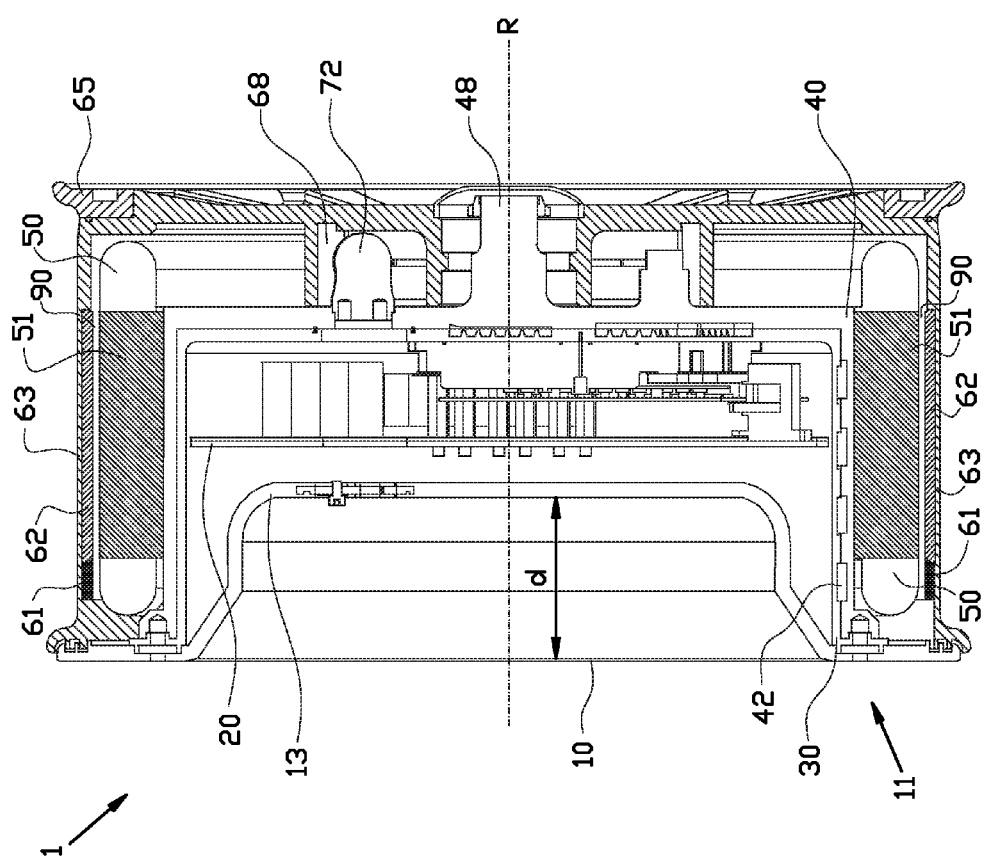
FIG. 5 shows a cross-sectional view of a wheel according to the present invention.

FIG. 5 shows a cross-sectional view of a wheel according to the present invention in the assembled state. It can be seen that all parts of the wheel are substantially within the volume spanned by the rim 63. In other words, the wheel has substantially no parts that protrude outside of said wheel past said first side, or past the wheel plate of the wheel.

The adapter plate 10 of the wheel may be mounted with its first side 11 to a vehicle, allowing any existing protrusions from the vehicle to protrude up to a distance d into the wheel 1. The control electronics 20 are mounted to the cooling unit 30 of the housing, which housing further comprises a hollow body 40. The stator 50, which comprises electromagnets 51, is supported by the housing and substantially surrounds it. The stator 50 is spaced apart from the rotor by an air gap 90. The rotor, comprising rim 63, wheel plate 64, wheel hub 67 and permanent magnets 62 held in place by mechanical locking ring 61, is supported by its wheel hub 67 on shaft 48 of the housing. The wheel plate 64 comprises drum 68, for engagement with the brake shoes when the brake system is activated. The construction of the rotor embodies several functions inside one piece of construction. The rotor provides an engagement surface for a mechanical brake system, supports the tire and is adapted for bearing at least part of the weight of a vehicle. At the same time, the rotor forms part of the in-wheel electrical motor of the wheel as it holds the permanent magnets required for propulsion of the vehicle. Finally, the rotor comprises the rim for fitting a tire. The rotor having this combined functionality is substantially lighter than the sum of weights of the individual components, thus significantly reducing the unsprung weight of a vehicle when one or more wheel according to the present invention are mounted on a vehicle, which is particularly advantageous in vehicle suspension systems in relatively small vehicles, such as cars.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

The invention claimed is:

1. A wheel for a vehicle comprising, inside the wheel:
   a housing having a first side for mounting to a vehicle;
   an electrical motor for driving movement of said vehicle, said electrical motor comprising a stator rotation-fixedly connected to said housing and a rotor rotationally coupled to said stator and having an axis of rotation, said stator being arranged within said rotor; and
   a brake system adapted for engaging the rotor for braking movement of said rotor relative to the stator,
   wherein said housing comprises a shaft rotation fixedly attached to said housing and protruding coaxially with the axis of rotation from said housing, wherein said shaft, when viewed along the axis of rotation, is spaced apart from said first side, said housing comprising a substantially hollow cylindrical body having a circumferential wall, and the first side being a substantially open first side, and an opposite substantially closed second side,
   said stator substantially surrounds and is supported by said housing,
   wherein the rotor comprises a rim for mounting a tire thereon, and a wheel plate comprising a hub for accommodating the shaft, said wheel plate further comprising said brake drum, wherein said brake system comprises an actuator adapted for actuating engagement of said brake system with said drum, and wherein the housing comprises control electronics for controlling the electromotor within the housing.

2. The wheel according to claim 1, wherein the control electronics comprise at least one of electronics, IGBT current modules or a current regulator, for controlling and supplying power to the electromotor.

3. The wheel according to claim 1, wherein the wheel is a direct drive wheel.

4. The wheel according to claim 1, wherein the brake system is mounted on a side of the housing opposite from said first side.

5. The wheel according to claim 1, wherein said brake system is arranged, when viewed along the axis of rotation, between the rotor and the housing.

6. The wheel according to claim 1, wherein said brake system comprises a first engagement surface for braking engagement with a second engagement surface on the rotor, wherein said wheel further comprises collection means adapted for collecting brake wear particles.

7. The wheel according to claim 6, wherein the collection means are located close to a point of engagement of said first and second engagement surfaces, preferably within a distance of 3 cm thereof.

8. The wheel according to claim 6, wherein said wheel further comprises a wheel bearing, wherein the collection means are adapted for collecting brake wear particles at a location spaced apart from said wheel bearing.

9. The wheel according to claim 6, wherein said first and/or second engagement surface comprises a metal, and wherein the collection means comprise magnets located close to said point of engagement.

10. The wheel according to claim 1, wherein the brake system is arranged spaced apart from said first side.

11. The wheel according to claim 1, wherein the stator comprises one or more electromagnets and wherein the rotor comprises permanent magnets placed around the one or more electromagnets.

12. The wheel according to claim 1, wherein said electromotor is, when seen along the axis of rotation, completely arranged between a first side of the rim and an opposite second side of the rim.

13. The wheel according to claim 1, wherein the brake system comprises a drum brake system.

14. The wheel according to claim 1, wherein said housing comprises a through passage for a wire or rod connected to the brake system from outside said wheel, wherein a displacement of the wire or rod relative to the brake system actuates the brake system.

15. The wheel according to claim 1, wherein the housing comprises a through passage for a duct comprising brake fluid connected to the brake system from outside said wheel, wherein a pressure change of said brake fluid in the duct actuates the brake system.

16. The wheel according to claim 1, wherein said housing extends along the width of said wheel along the axis of rotation over at least half of said width, preferably over at least three fourths of said width.

17. The wheel according to claim 1, wherein substantially all parts of the wheel within said housing at said first side are rotationally fixed relative to said housing.

18. The wheel according to claim 1, wherein said housing further comprises a cooling system adapted for cooling any one of the electrical motor, the control electronics and/or the brake system.

19. The wheel according to claim 1, wherein said housing comprises a substantially hollow body having a circumferential wall and a substantially open first side and an opposite substantially closed second side.

20. The wheel according to claim 19, wherein said housing further comprises an attachment adapter having a flange for attachment to the vehicle, and a substantially closed surface spaced apart from said flange when viewed along the axis of rotation.

21. The wheel according to claim 20, wherein said flange has a diameter greater than or equal to the diameter of said closed surface.

22. The wheel according to claim 20, wherein the attachment adapter is substantially shaped as an open ended flat-topped cone or an open ended flat-topped cylinder.

23. The wheel according to claim 20, wherein the substantially closed surface of the attachment adapter is spaced apart from said flange along the axis of rotation by a distance of at least one fifth of the width of said wheel along said axis of rotation.

24. A vehicle comprising the wheel according to claim 1.

25. A method for attaching a wheel to a vehicle, said wheel comprising a housing having a first side for mounting to a vehicle, an electrical motor for driving movement of said vehicle, said electrical motor comprising a stator rotation-fixedly connected to said housing and a rotor rotationally coupled to said stator and having an axis of rotation, said stator being arranged within said rotor, said wheel further comprising a brake system adapted for engaging the rotor for braking movement of said rotor relative to the stator, wherein said housing comprises control electronics for controlling the electrical motor, and wherein said brake system is arranged, when viewed along the axis of rotation, between the rotor and the housing, said method comprising the steps of:

selecting an attachment adapter from a series of attachment adapters having different dimensions, mounting the selected attachment adapter to said first side of the housing, mounting the selected attachment adapter to said vehicle, wherein the attachment adapter is selected based on a specific make or model of the vehicle.

26. The method according to claim 25, wherein the attachment adapters of the series of attachment adapters each have a flange for attachment to the vehicle, and a substantially closed surface, wherein the flanges have substantially similar dimensions, and a distance between the flange and the closed surface of each adapter varies in the series of adapters.

27. The wheel according to claim 1, wherein the rim, the wheel plate, the hub and the drum are attached together as one unity, and are formed together as a single piece.

28. The wheel according to claim 1, wherein said housing comprises a housing hollow body and a cooling system, each comprising a hollow cylinder having an open end at the first side of the wheel and a substantially closed end at their respective opposite sides, said cooling system being adapted to be substantially fittingly inserted in said hollow body.

29. The wheel according to claim 28, wherein an inner surface of the housing hollow body abutting an outer surface of the cooling system so as to define a groove there between for transporting a cooling liquid.

* * * * *